(No Model.) 2 Sheets—Sheet 2.

J. M. RIDLEY.
COTTON PICKER.

No. 246,818. Patented Sept. 6, 1881.

Attest.
E. R. Hill
J. W. McStrehle

Inventor
James M. Ridley
per Wm. Hubbell Fisher
Atty

UNITED STATES PATENT OFFICE.

JAMES M. RIDLEY, OF CINCINNATI, ASSIGNOR OF TWO-THIRDS TO LEWIS WILEY, OF SAME PLACE, AND WM. WILEY, OF MOUNT WASHINGTON, OHIO.

COTTON-PICKER.

SPECIFICATION forming part of Letters Patent No. 246,818, dated Sepetember 6, 1881.

Application filed April 4, 1881. (No model.)

*To all whom it may concern:*

Be it known that I, JAMES M. RIDLEY, of Cincinnati, Hamilton county, Ohio, have invented certain new and useful Improvements in Cotton-Pickers, of which the following is a specification.

The object of my invention is to provide a machine for picking cotton from the boll in the field and conveying it to a wagon through the agency of rapid currents of air.

One feature of my invention consists in certain novel mechanisms, whereby the cotton is drawn from the boll and conveyed to the wagon.

Another feature of my invention consists in a peculiar construction of pickers, by the use of which the cotton may be picked from the boll at different stages of maturity.

Figure 1:
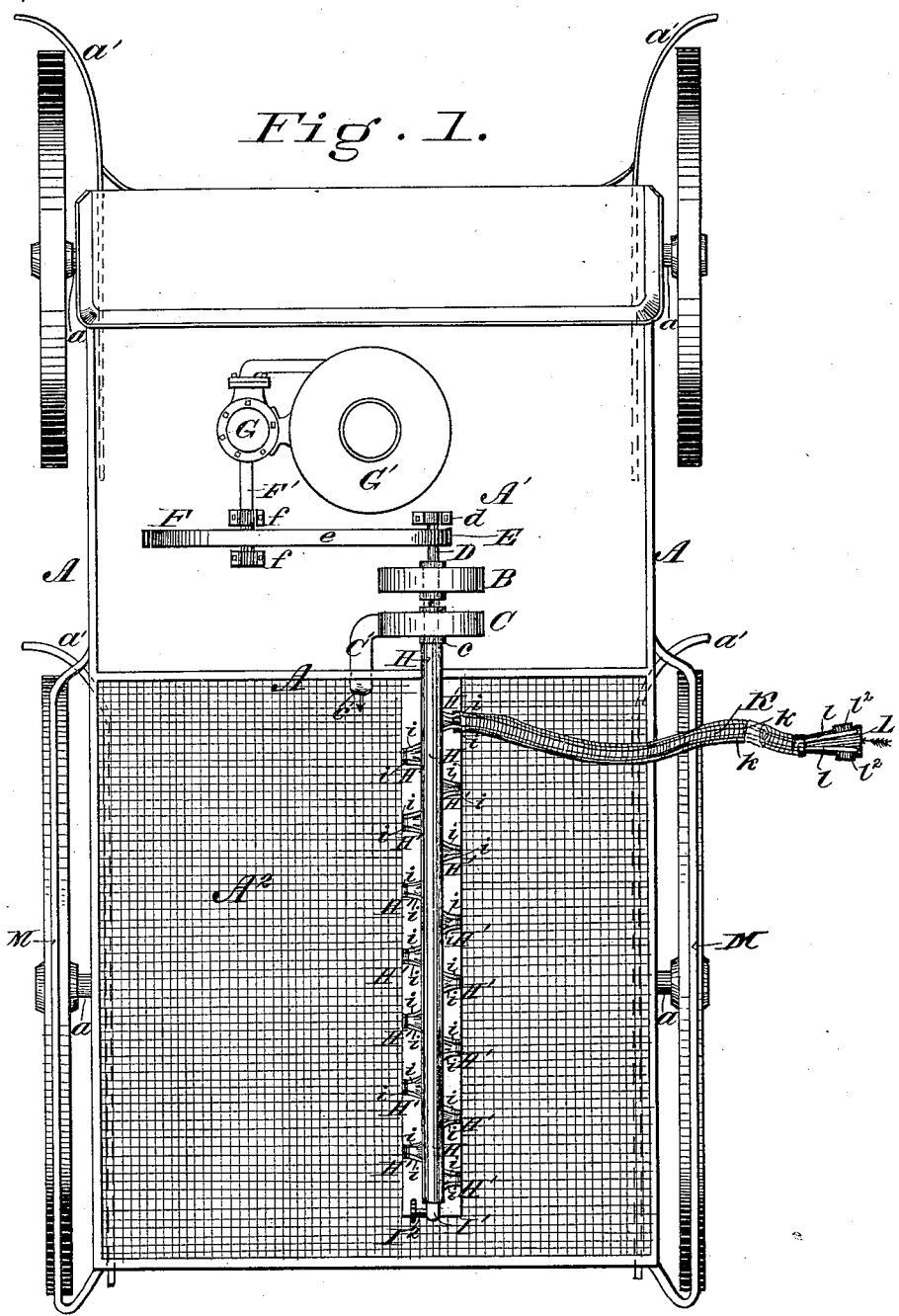
Figure 2:
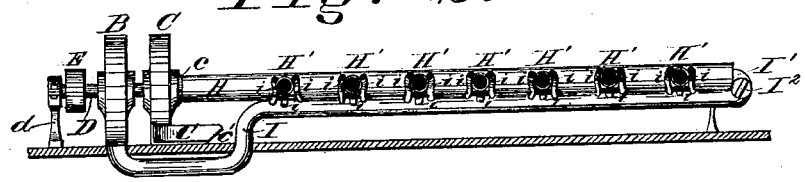
Figure 3:
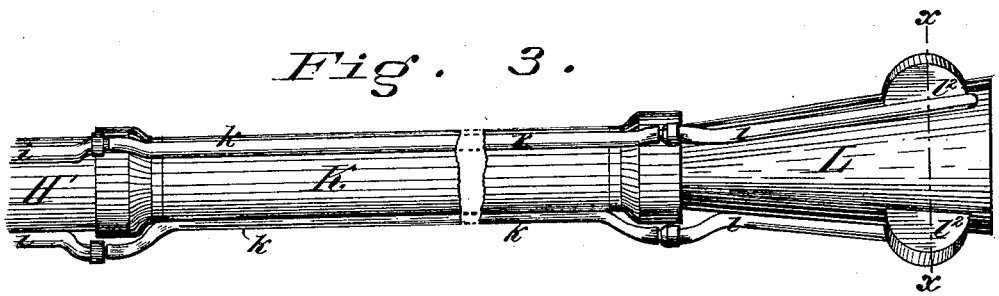
Figure 4:
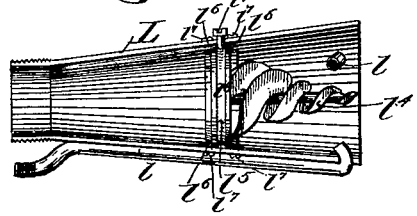
Figure 5:
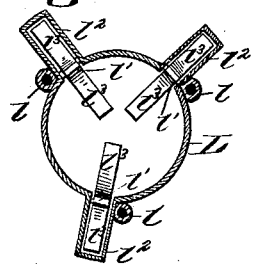
Figure 6:
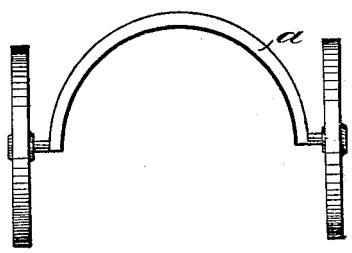

The nature of the various features of my invention will be obvious from the following description:

Figure 1 is a top-plan view of my invention shown in place in a wagon, together with the engine for operating said invention. Fig. 2 is a detached side elevation of the operating parts of my invention. Fig. 3 is an enlarged detached side elevation, showing one form of the picking-cup used, together with the connecting tube and the connections at each end of said tube. Fig. 4 is an enlarged axial sectional view of another form of picking-cup. Fig. 5 is a cross-section of picking-cup shown in Fig. 3, taken on the line X X; Fig. 6, a small end elevation of one truck of the wagon used, showing preferred method of making axles.

In the drawings accompanying and forming a part of this specification similar parts are designated by similar letters.

The wagon-bed A is mounted in any preferred manner upon the ordinary running-gear of a wagon, the axles $a$ being of sufficient size to enable them to come about midway between the rows, thus enabling the vehicle to straddle one row, both the gage and the height above referred to being generally made about five feet each. The wheels are protected by fenders or guards $a'$, which prevent the wheels from coming in contact with cotton-plants as the wagon is moved along over the row.

The operating parts of my invention consist of a pressure-blower, B, and a suction-blower, C, the fans of both of which are keyed or fastened to the shaft D, supported on suitable standards $d$. These blowers may be of any preferred pattern or style of construction, the fans of the suction-blower being preferably curved in the direction of their revolution, while the fans of the pressure-blower are preferably straight. The shaft D has also a small pulley, E, attached to it at the end nearest the front of the wagon, this pulley E being connected by the belt $e$ to the large pulley or driving-wheel F, which is fastened to the shaft F', which in turn is supported by the standards $ff$, and connected to the engine G in the usual manner. This engine G is preferably of an upright pattern, and has the usual connections, &c., with the boiler G'. All of the above-described mechanism is securely fastened to the front end, A', of the wagon-bed A, which is constructed sufficiently strong to bear the weight of same and to resist all strains caused by the same.

Running back to the side of the wagon and parallel to its length, and at right angles to the plane of revolution of the blowers, is a pipe, H, attached to the center orifice, $c$, on the rear side of the suction-blower C, and connecting with the interior of the same. This pipe H is provided with any preferred number of horizontal nozzles H', projecting at right angles to its axis out toward each side of the wagon, they being preferably so arranged that the nozzle on one side of the pipe H is opposite the space between the two nearest ones on the opposite side, and vice versa. The outlet C' of the suction-blower C is bent around so as to form a right-angled elbow, and is carried sufficiently toward the rear of the wagon to allow its mouth $c'$ to come entirely within the chamber $A^2$ of the wagon-bed A, said mouth being bent slightly downward. The sides and bottom of this chamber $A^2$ are composed of an open net-work, either of wire-cloth, willow-work, or other net-work, to permit the free escape of air coming from the blowers and yet retain the cotton in said chamber.

Attached to the outlet of and communicating with the interior of the pressure-blower B is the pipe I, the blower being preferably located so that the outlet, and consequently the pipe I, are placed at the lowest point—that is, they lie immediately on top of the wagon-bed A. The pipe I is carried along, parallel to the length of the wagon, under the blower C, and is then brought up until it lies immediately under the pipe H, running along the entire length thereof, the two pipes H and I being connected at the ends farthest from the blowers by the bend I', in which is located an ordinary cock, I².

Connecting with the pipe I at the points nearest the various nozzles H' are small tubes $i$, preferably three for each nozzle. The tubes $i$ are so arranged that they lie closely against the outer surfaces of the nozzles, being equidistant apart and generally two near the top and one at the bottom of each nozzle. The tubes are, however, slightly raised when a short distance from the mouth of each nozzle. The nozzles and the tubes both have screw-threads cut upon their peripheries at their mouths.

The tube K, of which there may be one for each and every nozzle, is made of non-flexible rubber hose, of any desired length, having attached to its outer surface a number of smaller tubes, $k$, corresponding in number and relative position to the tubes $i$. These tubes $k$, for convenience in handling the large tube K, are made of a flat oval shape and snugly fitted or woven to the outer surface of the large tubes, except that at each end of each large tube they are made circular in form and lie detached from the large tubes. Both the large tube K and its smaller tubes $k$ are provided at each end with hose-couplings, by which the tube K may be attached at one end to a nozzle, H', the smaller tubes $k$ likewise fitting their corresponding tubes $i$ at same end, the latter being sufficiently raised at their ends to permit the couplings of the tubes $k$ to be screwed on. To the opposite end of said tubes K are attached the picking-cups L, the construction of which latter can be and is variously modified, the general shape, however, being the same and the modifications consisting of various devices and appliances for separating and drawing in the cotton out of the boll. The general shape of the picking-cup L is that of a flaring circular tube having the mouth considerably larger than the opposite extremity, which latter has a screw-thread cut upon its periphery, to which is attached, by means of a hose-coupling, one of the tubes, K, the smaller tubes $k$ being attached in a similar manner to the corresponding small tubes $l$, similarly situated upon the outer surface of the cup L, and sufficiently raised from the same at the end where the tube K is attached to permit the hose-couplings of the small tubes $k$ to be screwed onto the ends of the tubes $l$, the same having a corresponding screw-thread cut upon said ends. These small tubes $l$ are snugly fitted to the outer surface of the cup L, with the exception above mentioned, and extend to within a short distance of the mouth of the cup, where they are bent down and enter, through the shell of the cup, to the interior, being then slightly bent toward the interior—that is, in a direction toward the nozzles H'—projecting, however, only a short distance into the interior of the cup. Lying alongside of each tube, and near the mouth of the cup, are the small paddle-wheels $l'$, corresponding in number to the number of tubes, and so situated that the plane of revolution of each one is coincident with a radius of the circle at the point where the wheel intersects the periphery of the cup L, and at the same time is also parallel to the longitudinal axis of the cup. The wheels $l^3$ are journaled in the housings $l^2$, attached to the outer surface of the cup L, and project into the interior of the same, leaving a small space in the center of said interior. The paddles $l^3$ of these wheels are preferably curved in a direction opposite to that of their revolution.

A modified form of the cup L consists in dispensing with these paddle-wheels and substituting therefor a pointed propeller-screw, $l^4$, preferably of three blades and located immediately in the center of the cup L, the point of the screw coming about flush with the mouth of the cup and the back of it secured to a ring, $l^5$, which snugly fits the interior of the cup L, and is held in place by and revolves between the two stationary rings $l^6$, which are secured firmly to the interior of the cup in any suitable manner—in the present instance by the screws $l^7$ passing through the shell of the cup into said rings $l^6$. To prevent the ring $l^5$ from binding it may have cut into its periphery, midway between each edge, an annular groove, $l^8$, into which is fitted the end of a set-screw, $l^9$, which passes into said groove through the shell of the cup L midway between the inner edges of the rings $l^6$. A still further modification consists in entirely dispensing with the paddle-wheels, screw, or other similar appendages, and using a plain cup only.

In place of the paddle-wheels or the propeller-wheel any suitable device for disturbing the cotton in the boll and aiding in detaching it therefrom may be employed in connection with the picking-tube. So, also, the mode of connecting the various tubes to one another may be varied from that described. A guard-rail, M, is also provided, which passes over and above the reach-wheels of the wagon, serving to support the tubes K.

When it is desired to operate my machine, the wagon or other vehicle containing it is conveyed or drawn to the desired location, the various tubes K being attached to corresponding nozzles. Each man employed takes a tube and holds the cup up closely around one boll at a time of a cotton-plant. Power now being transmitted, by means of the engine G or any other preferred method, to the pulley E, which is considerably smaller than the pulley F, the shaft D is rotated at a very high speed, causing the fans in both the blowers to rotate at a correspondingly high speed. Supposing, now, that the cotton to be picked is barely ripe, then a cup having the screw-propeller $l^4$ is used, and the air being forced by the pressure-blower B through the pipe I, (the connection between said pipe I and the pipe H being closed by cock $I^2$,) it follows through the small tubes $i$, $k$, and $l$ to the mouth of the cup L, where, being directed by the bends in the tubes $l$ against the propeller-screw $l^4$, it causes the same to rotate, and the cup being pressed against the boll the point of the screw penetrates the boll, thoroughly loosening the same, and by means of its (the screws) blades and revolution draws the cotton from the boll into the cup and at the same time thoroughly separates it, this operation being materially assisted both by the draft from the tubes $l$, as heretofore mentioned, and also by the suction from the suction-blower C, which, assisted by the draft received into the cup from the pressure-blower, creates a strong current of air through the various tubes K and into the pipe H to the blower C, drawing the cotton with it through said tubes K and pipe H into said blower C, where it is expelled by the action of the fans and pressure of the air through the outlet $C'$ into the chamber $A^2$, which, having a wicker-like or open bottom, as heretofore described, offers a minimum of resistance only to the blast, thus permitting the cotton to fall to the bottom. When the cotton is medium ripe the cup having the paddle-wheel attachments is used, the operation being the same, except that, the boll being open, there is no necessity for the boring operation, the pressure from the blower B being directed inwardly and the suction from C being sufficient to draw the cotton out of the boll in toward the paddle-wheels, which tend to separate it and force it inwardly, when it is conveyed, as heretofore described, to the chamber $A^2$. In this operation the curved form of the paddles $l^3$ causes the same to catch the pressure of the wind better and at the same time prevents them from drawing up the cotton into the housings of the wheels. When the cotton is fully ripe a plain cup may be used without any paddle-wheels or screws. When using this cup the ends of the small tubes $k$ are closed by means of screw-plugs or cocks attached near their ends. The cock $I^2$ is then preferably opened and direct communication thereby established between the pipes H I, thus doubling the force of the suction by the addition of the pressure from the pressure-blower B. The further operation will be substantially the same as heretofore described.

The tubes K may be made of any desired length, and being transversely non-elastic they successfully resist the action of the suction against their sides, the length of the tubes K also being such that a considerable space can be picked over without moving the apparatus, and at the same time a sufficient space can be picked in front of the vehicle to allow it to be moved forward without encountering any unpicked plants.

When only ripe cotton is to be picked and the plain cup is used the pressure-blast may be altogether dispensed with.

The employment of a cage or chamber, as $A^2$, for the reception of the cotton is preferable to delivering the latter into an open box or uninclosed space, as the blasts of air from the exhaust-blower tend to scatter the cotton over too large an area to be afterward conveniently gathered.

What I claim as new and of my invention, and desire to secure by Letters Patent, is—

1. In a cotton-picking machine, the combination of the flexible tubes K and a suitable suction apparatus and picker whose mouth is provided with a supplementary movable device for aiding in detaching the cotton from the bolls, said supplementary device being located and operating wholly within the said picker, substantially as and for the purposes specified.

2. In a cotton-picking machine, the combination of the flexible tubes K $k$ and a suitable suction and blowing apparatus and picker whose mouth is provided with a supplementary movable device for aiding in detaching the cotton from the bolls, said supplementary device being located and operating wholly within the said picker, substantially as and for the purposes specified.

3. In a cotton-picking machine, the combination of the flexible tubes K $k$ $l$ and a suitable suction and blowing apparatus and a picker whose mouth is provided with a supplementary movable device for aiding in detaching the cotton from the bolls, said supplementary device being located and operating wholly within the said picker, substantially as and for the purposes specified.

4. In a cotton-picking machine, the combination of the flexible tubes K $k$ and a suitable draft and blowing apparatus and the picker L, the mouth of said picker being provided with a revolving device for aiding in detaching the cotton from the bolls, substantially as and for the purposes specified.

5. In a cotton-picking machine, the combination of the flexible tubes K $k$ and a suitable draft and blowing apparatus and the picker L, the latter being provided with the paddle-wheels $l'$, substantially as and for the purposes specified.

6. The picking-cup L, provided with tubes $l$, paddle-wheels $l'$, and connecting and operating mechanism, substantially as herein described.

7. In a machine for picking cotton, the combination of a vehicle, air-exhaust device, cage or chamber $A^2$, located on the vehicle, substantially as described, and the pipe H, located parallel to the length of the wagon and above the cage, and provided at each side with the series of pipes K, terminating in a cotton-picking mouth or tube, substantially as and for the purposes specified.

8. In a machine for picking cotton, the combination of a vehicle, air-exhaust device, cage or chamber A², located on the vehicle, substantially as described, and the pipe H, located parallel to the length of the wagon, and provided with a series of nozzles, H', to each of which is attached a flexible tube, K, provided with a picker, substantially as and for the purposes specified.

9. In a machine for picking cotton, the combination of a vehicle, air-exhaust device, and blower for forcing air through the side tubes, k, and cage or chamber A², said air-exhaust and blower and cage being located on the vehicle, substantially as described, pipe H, located parallel to the length of the vehicle and above the cage, and provided with a series of flexible tubes the outer end of each of which is provided with a picker, tube I, provided with tubes k, arranged at the side of their respective tubes K and opening into the latter at or in the vicinity of the picker, substantially as and for the purposes specified.

10. In a machine for picking cotton, the combination of a vehicle, air-exhaust device, blower for forcing air through the side tubes, k, and cage or chamber A², said air-exhaust and blower and cage being located on the vehicle, substantially as described, pipe H, located parallel to the length of the vehicle and above the cage, and provided with a series of flexible tubes the outer end of each of which is provided with a picker, tube I I', provided with tubes k, arranged at the side of their respective tubes K and opening into the latter at or in the vicinity of the picker, and stop-cock I², substantially as and for the purposes specified.

JAMES M. RIDLEY.

Witnesses:
A. S. LUDLOW,
J. WM. STREHLI.